US009640080B1

(12) United States Patent
Wang et al.

(10) Patent No.: US 9,640,080 B1
(45) Date of Patent: May 2, 2017

(54) AIRCRAFT MANEUVER DATA MANAGEMENT SYSTEM

(71) Applicant: Honeywell International Inc., Morristown, NJ (US)

(72) Inventors: Guoqing Wang, Beijing (CN); Rong Zhang, Beijing (CN); Kevin J Conner, Kent, WA (US); Ruy C. Brandao, Redmond, WA (US); Zhong Chen, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/886,982

(22) Filed: Oct. 19, 2015

(51) Int. Cl.
G08G 5/00 (2006.01)

(52) U.S. Cl.
CPC ......... *G08G 5/0078* (2013.01); *G08G 5/0065* (2013.01)

(58) Field of Classification Search
CPC ......... G06F 19/00; G08G 5/0078; G08G 5/00
See application file for complete search history.

(56) References Cited

U.S. PATENT DOCUMENTS

| | | | |
|---|---|---|---|
| 6,567,043 B2 | 5/2003 | Smith et al. | |
| 6,735,500 B2 | 5/2004 | Nicholas et al. | |
| 6,950,037 B1 | 9/2005 | Clavier et al. | |
| 7,747,360 B2 | 6/2010 | Canu-Chiesa et al. | |
| 7,755,516 B2 | 7/2010 | Clark et al. | |
| 8,019,529 B1 | 9/2011 | Sharma et al. | |
| 8,024,078 B2 | 9/2011 | Coulmeau et al. | |
| 8,457,812 B2 | 6/2013 | Zammit-Mangion et al. | |
| 8,660,713 B2 | 2/2014 | Khatwa et al. | |
| 8,665,121 B2 | 3/2014 | Shavit | |
| 8,665,133 B2 | 3/2014 | Khatwa et al. | |
| 8,855,906 B2 | 10/2014 | Schwinn et al. | |
| 8,977,482 B2 | 3/2015 | Ballin et al. | |
| 9,026,272 B2 * | 5/2015 | Kokkeby | G01S 3/7864 701/3 |

(Continued)

FOREIGN PATENT DOCUMENTS

| | | | |
|---|---|---|---|
| WO | 9822922 A1 | 5/1998 | |
| WO | 02099769 A1 | 12/2002 | |

(Continued)

OTHER PUBLICATIONS

International Application No. PCT/CN2014/090316, by Honeywell International Inc. (Inventors: Ruy C. Brandao et al.) filed Nov. 5, 2014.

*Primary Examiner* — Thomas Tarcza
*Assistant Examiner* — Alex C Dunn
(74) *Attorney, Agent, or Firm* — Shumaker & Sieffert, P.A.

(57) ABSTRACT

This disclosure is directed to systems and methods for generating outputs based on collected aircraft maneuver data. In one example, a system is configured to collect surveillance data from one or more aircraft. The system is further configured to identify, from the collected surveillance data, aircraft maneuver data indicative of maneuvers of the one or more aircraft. The system is further configured to store the aircraft maneuver data in a data store. The system is further configured to perform one or more analyses of the stored aircraft maneuver data in the data store. The system is further configured to generate an output based on the one or more analyses of the stored aircraft maneuver data.

20 Claims, 7 Drawing Sheets

(56) References Cited

U.S. PATENT DOCUMENTS

| | | | | |
|---|---|---|---|---|
| 9,412,278 B1* | 8/2016 | Gong | G08G 5/0039 | |
| 2003/0222795 A1* | 12/2003 | Holforty | G01C 23/005 | 340/968 |
| 2006/0224318 A1* | 10/2006 | Wilson | G08G 5/0052 | 701/469 |
| 2008/0154448 A1* | 6/2008 | Mead | G06Q 50/00 | 701/14 |
| 2009/0157233 A1* | 6/2009 | Kokkeby | G01S 3/7864 | 701/3 |
| 2010/0332053 A1* | 12/2010 | Brotherton | G05D 1/0055 | 701/3 |
| 2012/0215435 A1* | 8/2012 | Subbu | G08G 5/0013 | 701/120 |
| 2013/0110387 A1* | 5/2013 | Castillo-Effen | G08G 5/0095 | 701/120 |
| 2013/0265187 A1 | 10/2013 | Hall | | |
| 2014/0136110 A1 | 5/2014 | Nykl et al. | | |
| 2015/0019048 A1* | 1/2015 | Krishna | B64D 45/00 | 701/4 |
| 2015/0194059 A1* | 7/2015 | Starr | G06F 3/0484 | 701/3 |
| 2015/0235559 A1* | 8/2015 | Alekseev | G08G 5/0095 | 701/120 |
| 2015/0348421 A1* | 12/2015 | Kashi | G08G 1/16 | 701/10 |
| 2016/0093222 A1* | 3/2016 | Hale | G08G 5/0039 | 701/120 |

FOREIGN PATENT DOCUMENTS

| | | | |
|---|---|---|---|
| WO | 2006125725 A1 | 11/2006 | |
| WO | 2014115139 A1 | 7/2014 | |

\* cited by examiner

AIRCRAFT MANEUVER DATA MANAGEMENT SYSTEM

This disclosure relates to aviation.

BACKGROUND

Air traffic control systems track positions and velocity of aircraft and help manage aircraft trajectories. Air traffic control has traditionally been based on radar surveillance, supplemented more recently with cooperative radio surveillance techniques, such as automatic dependent surveillance-broadcast (ADS-B). An aircraft may determine its own position, such as via a Global Navigation Satellite System (GNSS), and periodically broadcast its position via a radio frequency, which may be read by ground stations and other aircraft. Aircraft position data may be provided to a variety of other applications that serve functions such as traffic situational awareness, traffic alert, and collision avoidance, for example.

SUMMARY

Various examples provided herein are generally directed to techniques, systems, devices, computer program products, and methods for collecting cooperative surveillance data such as ADS-B data from a number of aircraft, identifying and storing data associated with various maneuvers such as takeoff and landing maneuvers of the various aircraft, and generating outputs based on the stored aircraft maneuver data. The stored data may be analyzed, processed, and used to create a "maneuver database" of large numbers of aircraft air and ground maneuvers and tracks that may be useful for a variety of applications such as airport geographic databases, airport ground traffic guidance, air traffic control, wake vortex turbulence avoidance, and enhanced Traffic Situation Awareness with Alerts (TSAA).

In one example, a system is configured to collect surveillance data from one or more aircraft. The system is further configured to identify, from the collected surveillance data, aircraft maneuver data indicative of maneuvers of the one or more aircraft. The system is further configured to store the aircraft maneuver data in a data store. The system is further configured to perform one or more analyses of the stored aircraft maneuver data in the data store. The system is further configured to generate an output based on the one or more analyses of the stored aircraft maneuver data.

In another example, a method includes collecting, by one or more processors, surveillance data from one or more aircraft. The method further comprises identifying, by one or more processors, from the collected surveillance data, aircraft maneuver data indicative of maneuvers of the one or more aircraft. The method further comprises storing, by one or more processors, the aircraft maneuver data in a data store. The method further comprises performing, by one or more processors, one or more analyses of the stored aircraft maneuver data in the data store. The method further comprises generating, by one or more processors, an output based on the one or more analyses of the stored aircraft maneuver data.

In another example, a device includes means for collecting surveillance data from one or more aircraft. The device further includes means for identifying, from the collected surveillance data, aircraft maneuver data indicative of maneuvers of the one or more aircraft. The device further includes means for storing the aircraft maneuver data in a data store. The device further includes means for performing one or more analyses of the stored aircraft maneuver data in the data store. The device further includes means for generating an output based on the one or more analyses of the stored aircraft maneuver data.

The details of one or more examples are set forth in the accompanying drawings and the description below. Other features, objects, and advantages will be apparent from the description and drawings, and from the claims.

DETAILED DESCRIPTION

Figure 1:
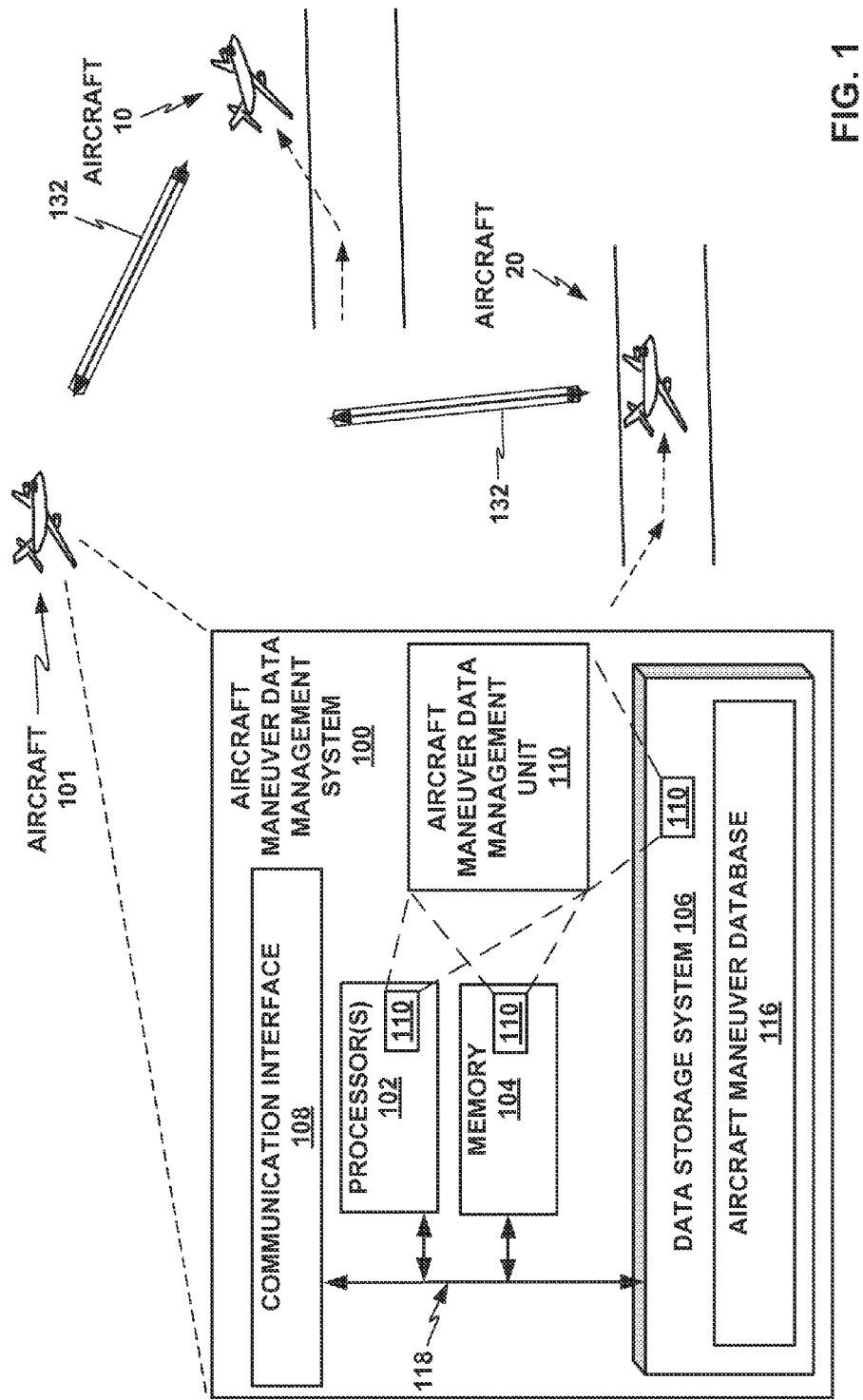
FIG. 1 shows a conceptual block diagram of an example aircraft maneuver data management system that is configured to receive surveillance data from various aircraft; identify and store aircraft maneuver data related to or indicative of various maneuvers of the various aircraft from among the received surveillance data; and build a "maneuver database" of the aircraft maneuver data including data indicative of numbers of analogous aircraft maneuvers, such as aircraft takeoffs and landings, for example.

FIG. 1 shows a conceptual block diagram of an example aircraft maneuver data management system 100 that may be installed on aircraft 101 and is configured to receive surveillance data from various aircraft such as representative example aircraft 10 and 20; identify and store aircraft maneuver data related to or indicative of various maneuvers of the various aircraft 10 and 20 from among the received surveillance data; and build a "maneuver database" of the aircraft maneuver data including data indicative of numbers of analogous aircraft maneuvers, such as aircraft takeoffs and landings, for example. Aircraft maneuver data management system 100 may generate outputs, e.g., to other systems or functions onboard aircraft 101, based on the stored aircraft maneuver data for applications such as airport geographic databases, airport ground traffic guidance, air traffic control, wake vortex turbulence avoidance, and enhanced Traffic Situation Awareness and Alert (TSAA).

Aircraft maneuver data management system 100 includes one or more processors 102 ("processors 102"), one or more memory components 104 ("memory 104"), a data storage system 106, and a communication interface 108, all interconnected via communication channels 118 (e.g., busses, switch fabric, Ethernet or other network connections). Aircraft maneuver data management system 100 also includes aircraft maneuver data management unit 110 in the example implementation of FIG. 1. Aircraft maneuver data management unit 110 may be or include one or more software applications, modules, libraries, or other sets of software that may be stored in data storage system 106, loaded onto memory 104, and/or executed by processors 102 to perform potentially any of the techniques and methods described in this disclosure.

Aircraft maneuver data management system 100 may receive data from aircraft 10 and 20 via surveillance transmissions 132, for example, transmitted and received via radio antennas communicatively connected with communication interface 108. Cooperative surveillance transmissions 132 may include ADS-B, Traffic Collision Avoidance System (TCAS), or other surveillance data transmitted between aircraft 10 and 20 and aircraft 101, and potentially also to a ground-based station. The surveillance data from any particular aircraft may include own aircraft data from that aircraft as well as aircraft data from other aircraft received by the particular aircraft. Aircraft maneuver data management unit 110 is further described below in an example implementation focused on collecting and processing aircraft maneuver data on aircraft takeoffs and landings, with the understanding that analogous descriptions may apply to any of a variety of other implementation details involving collecting and processing any other types of aircraft maneuvers. Aircraft maneuver data management system 100 is further described below in example implementations, with the understanding that a variety of other implementation details may be encompassed within the scope of this disclosure.

Cooperative surveillance technology such as ADS-B may provide both flight crews and ground control personnel with very specific information about the location and speed of various aircraft. ADS-B, which may be transmitted in standards for either 1090 megahertz (MHz) or 978 MHz, may provide more accurate and more timely surveillance information than radar, and clearly and immediately indicate aircraft trajectory changes such as turns, accelerations, climbs, and descents. ADS-B may rapidly indicate when air traffic conflicts may occur between more than one aircraft. Receiving a substantial amount of ADS-B information generated by an aircraft may be sufficient to identify critical maneuvers (e.g., maneuvers during takeoff sequences and landing sequences, maneuvers in flight altitude level changes in cruise) and how the maneuvers relate to each other for that type or category of aircraft taking off or landing. Aircraft maneuver data management system 100 may also receive and store aircraft maneuvers from any other areas besides airport vicinities and other phases of flight besides takeoff sequences and landing sequences, in various examples. However, the ADS-B information received from the various aircraft tends to include significant received data discontinuities and/or erroneous data. This may be particularly true of takeoff sequences and landing sequences, when ground obstacles may obstruct surveillance data transmissions. Takeoff maneuvers may include takeoff roll starts, takeoff rolls and takeoffs, and landing maneuvers may include flares, touchdowns, and landing rolls, as further described below.

Aircraft maneuver data management system 100 may perform algorithms to perform analyses of aircraft maneuvers based on ADS-B surveillance data in this example. Other implementations of an aircraft maneuver data management system 100 may also use other surveillance data (e.g., ADS-C, ADS-R, TIS-B), or any other source of aircraft data. Aircraft maneuver data management system 100 may identify particular types of data from the aircraft surveillance data it receives. The aircraft maneuver data used by aircraft maneuver data management system 100 in its analysis algorithms may include reported altitude, vertical rate, ground speed (either directly reported or derived from directional speeds), track angle (either directly reported or derived from directional speeds), vertical acceleration (derived from vertical rate), horizontal acceleration (derived from ground speed), and aircraft emitter category. In addition, aircraft maneuver data management system 100 may also receive and identify airborne/on-ground status transitions reported by the aircraft and compare the reported airborne/on-ground status transitions with its own determinations of airborne/on-ground status transitions to validate the detected transitions in some cases. Aircraft maneuver data management system 100 may be capable of more accurate determinations of in-air/on-ground status transitions of target aircraft than other aircraft systems (e.g., reported in-air/on-ground status from target aircrafts' surveillance data), and may communicate its determined in-air/on-ground status transitions to other aircraft systems or functionalities.

Figure 2:
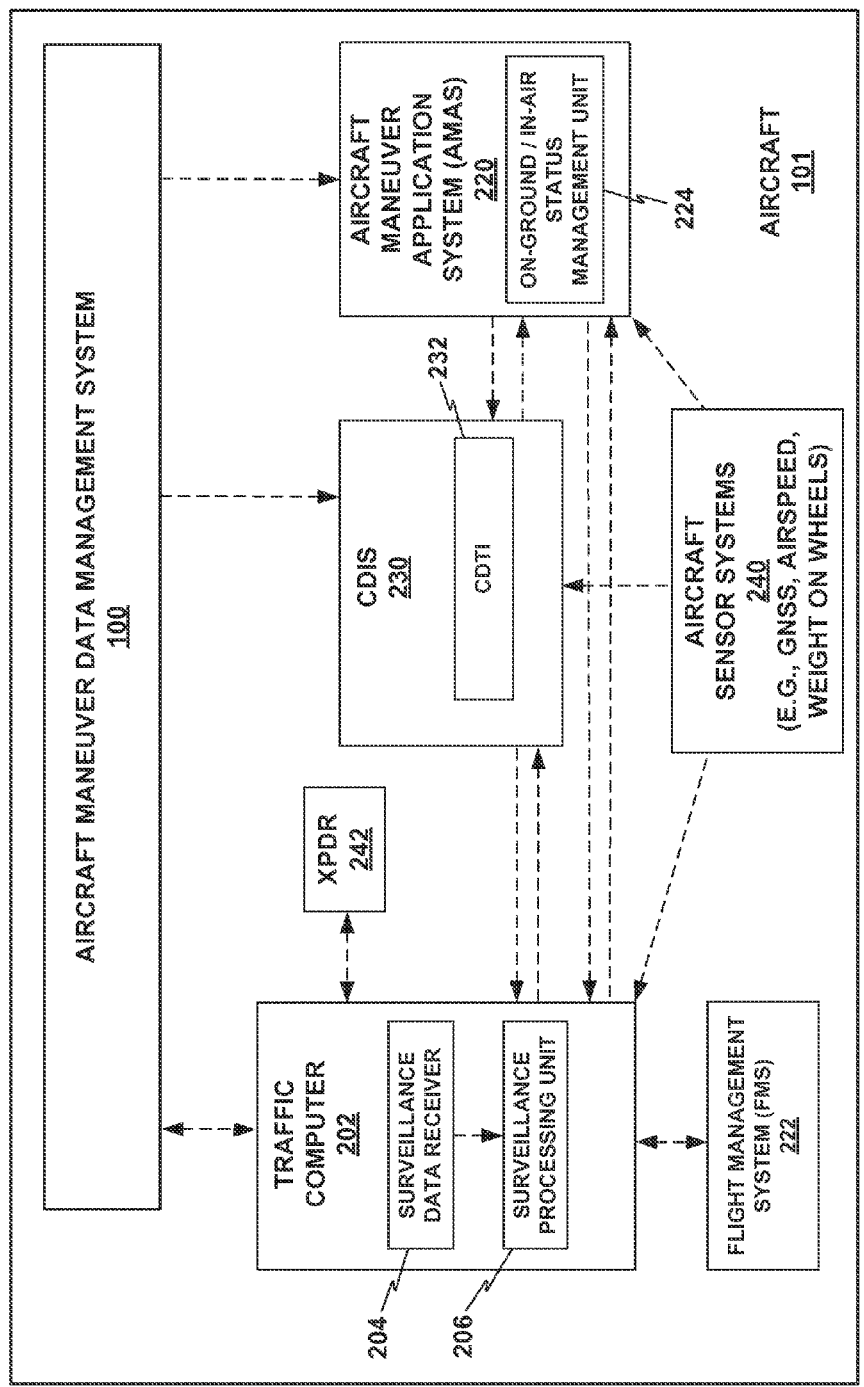
FIG. 2 depicts a conceptual block diagram of onboard systems of an aircraft that is equipped with an aircraft maneuver data management system, in an example of this disclosure.

FIG. 2 depicts a conceptual block diagram of onboard systems of an own aircraft 101 that is equipped with an aircraft maneuver data management system 100, in an example of this disclosure. Aircraft 101 is equipped with an onboard traffic computer 202, an Aircraft Maneuver Application System (AMAS) 220 (e.g., a smart runway geography database system, as further described below), a Flight Management System (FMS) 222, a cockpit display/input system (CDIS) 230, and aircraft sensors 240 that may include a Global Navigation Satellite System (GNSS) unit, an airspeed indicator, a groundspeed indicator, and a landing gear weight-on-wheels (WOW) indicator, for example. Onboard traffic computer 202 includes a surveillance data receiver 204 (e.g., ADS-B receiver) and a surveillance data processing unit 206. Surveillance data receiver 204 may be coupled to one or more antennas and one or more radio transceivers. Surveillance data receiver 204 may receive cooperative surveillance data from other aircraft and communicate the data to surveillance data processing unit 206. Other systems of aircraft 101 may communicate own aircraft data to traffic computer 202, such as FMS 222, AMAS 220, and aircraft sensors 240.

FMS 222 may communicate flight plan information to traffic computer 202. Traffic computer 202 may communicate speed adjustments to FMS 222. CDIS 230 includes a cockpit display of traffic information (CDTI) 232. CDIS 230 may receive and output information from Air Traffic Control (ATC).

Surveillance data receiver 204 may receive and process cooperative surveillance signals, e.g., ADS-B messages, from transponders of other aircraft. The ADS-B messages may include indications of traffic state data for the other aircraft (including, e.g., speed and heading of the other aircraft). Surveillance data receiver 204 may communicate the received aircraft state data to surveillance data processing unit 206. In other examples, the cooperative surveillance messages may include automatic dependent surveillance-contract (ADS-C) messages or other types of cooperative surveillance signals, and traffic computer 202 may be configured to track the speed of the other aircraft based on ADS-C messages or other types of cooperative surveillance signals received from the other aircraft. In still other examples, aircraft 101 may track the speed of other aircraft based on other techniques besides cooperative surveillance technologies, and communicate that data to aircraft maneuver data management system 100.

Aircraft sensor systems 240 include a GNSS unit, e.g., a Global Positioning System (GPS) unit, potentially also including enhancements such as a Wide Area Augmentation System (WAAS) unit. The GNSS unit may communicate state data of aircraft 101 to other systems of aircraft 101 including CDIS 230 and traffic computer 202. Traffic computer 202 may generate cooperative surveillance messages, e.g., ADS-B messages, to be communicated to aircraft maneuver data management system 100 and to be broadcast from own aircraft 101 via transponder 242 which may include one or more antennas and one or more radio transceivers to which traffic computer 202 may be coupled. Traffic computer 202 may also receive and communicate ADS-B messages or other surveillance data (e.g., ADS-C, ADS-R, TIS-B) with both aircraft state data for one or more other aircraft and own aircraft state data, which may be collected from any of various aircraft sensor systems 240. AMAS 220 (e.g., a smart runway geography database system), or other systems or devices of aircraft 101, to aircraft maneuver data management system 100.

Aircraft maneuver data management system 100 may receive the data from traffic computer 202 of aircraft 101. Aircraft maneuver data management system 100 may also receive data from other aircraft such as aircraft 10 and 20 of FIG. 1, e.g., by way of transmissions via surveillance broadcast systems such as ADS-B or other cooperative surveillance systems (e.g., ADS-C, ADS-R, TIS-B). Aircraft maneuver data management system 100 may collect, store, and analyze data from numerous aircraft over time and organize the stored maneuver data for multiple aircraft of each of several types of aircraft into respective aircraft type maneuver data templates for the respective types of aircraft. Aircraft maneuver data management system 100 may then communicate the respective aircraft type maneuver data to other onboard systems and/or functionalities of aircraft 101.

Aircraft maneuver data management system 100 may occasionally or periodically communicate information, such as any of a variety of different results of various analyses of aircraft maneuver data, as further described below, to systems of aircraft 101, such as AMAS 220 and/or traffic computer 202. The information received by aircraft 101 from aircraft maneuver data management system 100 may include accurately determined status information (e.g., on-ground status, airborne status) that may be more accurate than status information as determined by onboard systems of aircraft 101, and that may be used by AMAS 220, e.g., to initiate and terminate airborne flight management modes. The use of more accurately determined aircraft status information, such as for transitions in status between on-ground and airborne status, may provide advantages such as decreased workload for flight crews and Air Traffic Control (ATC), improved time efficiency and fuel efficiency of aircraft trajectories, and improved ground traffic management, as further described below. The information received by aircraft 101 from aircraft maneuver data management system 100 may be used for various other advantageous functions, as further described below.

In some examples, aircraft 101 may include only one or more of, but not all of, the example systems configured to receive information or data from aircraft maneuver data management system 100 as shown in FIG. 2, e.g., aircraft traffic computer 202, and/or on-ground/airborne status management unit 224 as part of AMAS 220. In some examples, aircraft 101 may include other systems, units, devices, or elements of executable software code, besides those that are depicted in FIG. 2, that may receive information from aircraft maneuver data management system 100 for any purpose. In various examples described below, aircraft 10 and 20 may also be equipped with analogous systems and components as those described with reference to aircraft 101.

Figure 3:
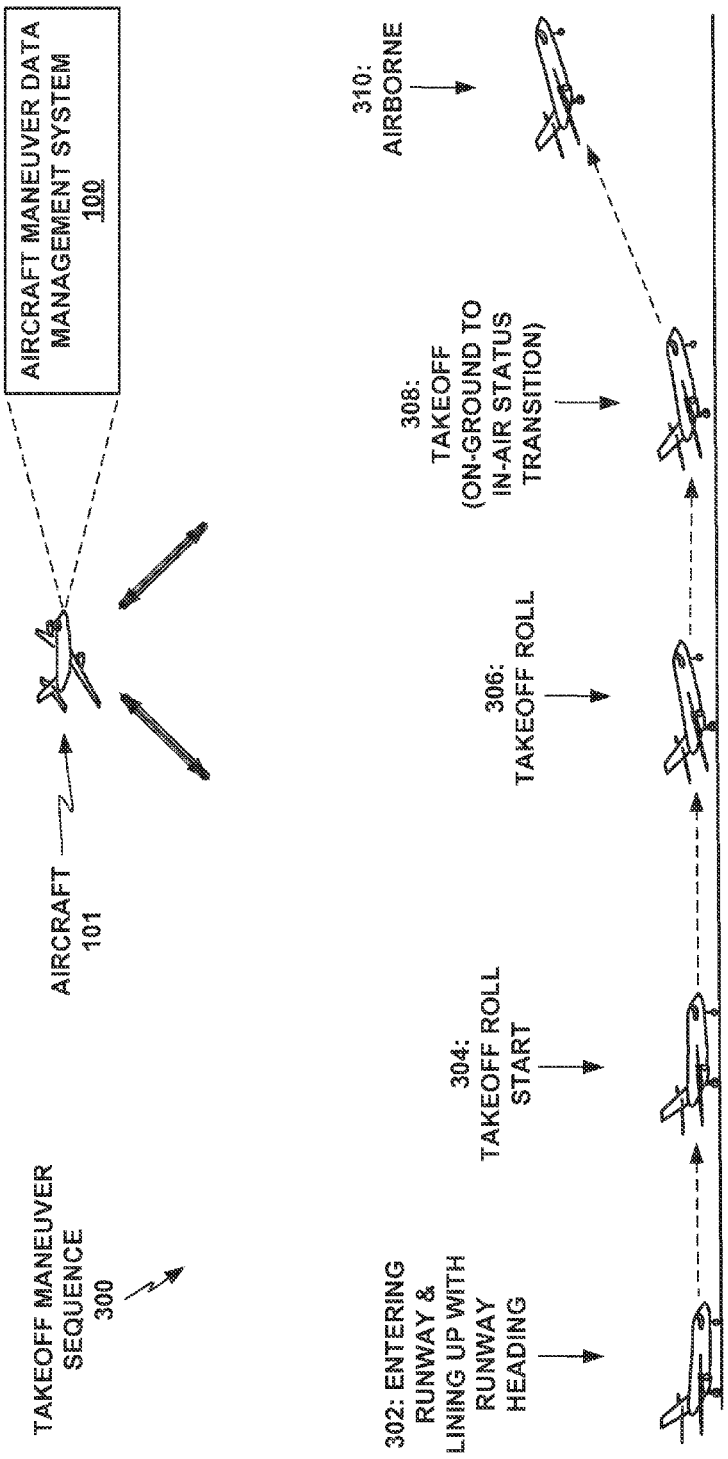
FIG. 3 depicts a conceptual diagram of an aircraft performing a takeoff maneuver sequence, during which the aircraft may transmit surveillance data to an aircraft maneuver data management system, in an example of this disclosure.

FIG. 3 depicts a conceptual diagram of aircraft 10 performing a takeoff maneuver sequence 300, during which aircraft 10 may transmit surveillance data to aircraft maneuver data management system 100 which resides in aircraft 101, in an example of this disclosure. In takeoff maneuver sequence 300, aircraft 10 may enter into a runway and line up with the runway heading (302), initiate takeoff roll start (304) (the first maneuver from the runway threshold), and perform a takeoff roll (306), i.e., aircraft 10 raises its pitch angle about the point of contact of the main landing gear wheels with the runway, such that the nose landing gear lifts up off the runway. Aircraft 10 then takes off (308) at the point in time when the main landing gear wheels lose contact with the runway, such that aircraft 10 becomes airborne (310), and transitions from on-ground status to in-air status. The transitions from on-ground status to in-air status may be used as an important input for aircraft systems such as AMAS 220. Various sensors of aircraft 10 and potentially other sensors may transmit data via cooperative surveillance transmissions to aircraft maneuver data management system 100 during takeoff maneuver sequence 300.

In some examples, aircraft maneuver data management system 100 may determine the timing of the on-ground status to in-air status transition, and may communicate information of the timing of the on-ground status to in-air status transition to other systems of aircraft 101, e.g., to AMAS 220. In some examples, aircraft maneuver data management system 100 may determine status information related to the maneuvers of aircraft 10, such as the timing of the on-ground status to in-air status transition, and may communicate the maneuver status information, e.g., information of the timing of the on-ground status to in-air status transition to aircraft, to AMAS 220 of aircraft 101.

As one example of aircraft maneuver data management system 100 providing more accurate status information, it may supplement or replace a signal from a weight-on-wheels (WOW) indicator that aircraft 10 may use on its main landing gear and/or the nose landing gear to indicate on-ground or in-air status in its cooperative surveillance broadcasts. At times, bumps on a runway or taxiway may induce a minor vertical acceleration of the landing gear that the WOW indicator may interpret as an on-ground to in-air transition. Aircraft maneuver data management system 100 may evaluate a larger range of data than a momentary indication of vertical acceleration of a WOW indicator, and may thus filter out or correct for erroneous data from the WOW indicator in the information it provides.

The information provided by aircraft maneuver data management system 100 may thus ensure that AMAS 220 onboard aircraft 101 does not erroneously initiate processes for flight management based on an erroneous in-air status transition indication from aircraft 10, in this example. AMAS 220 may be or include, for example, a smart runway geography database system that may activate ground traffic guidance and/or control dependent on indications that aircraft 101 is in an on-ground status. A runway geography database system may store geographic information on the layout of airport runways at all of a number of airports, potentially a very large number of airports, and may be updated frequently (e.g., once or several times per month) with new updates on the geographic layout of runways at the airports covered by the database, and to add runway geographic information for more new airports. In the absence of aircraft maneuver data management system 100, AMAS 220 may be prone to erroneous determinations or indications of status transitions between in-air status and on-ground status of aircraft 100, but aircraft maneuver data management system 100 may ensure that accurate in-air/on-ground status is communicated to AMAS 220. In other examples, AMAS 220 may be or include any other aircraft system that may consume or receive as inputs indications of status transitions between on-ground status and in-air status for aircraft 101. In various examples, AMAS 220 and aircraft maneuver data management system 100 may be incorporated in a single system, such as in different modules or subsystems in a single integrated computing system, or may be separate, distinct systems as depicted in FIG. 2.

Figure 4:
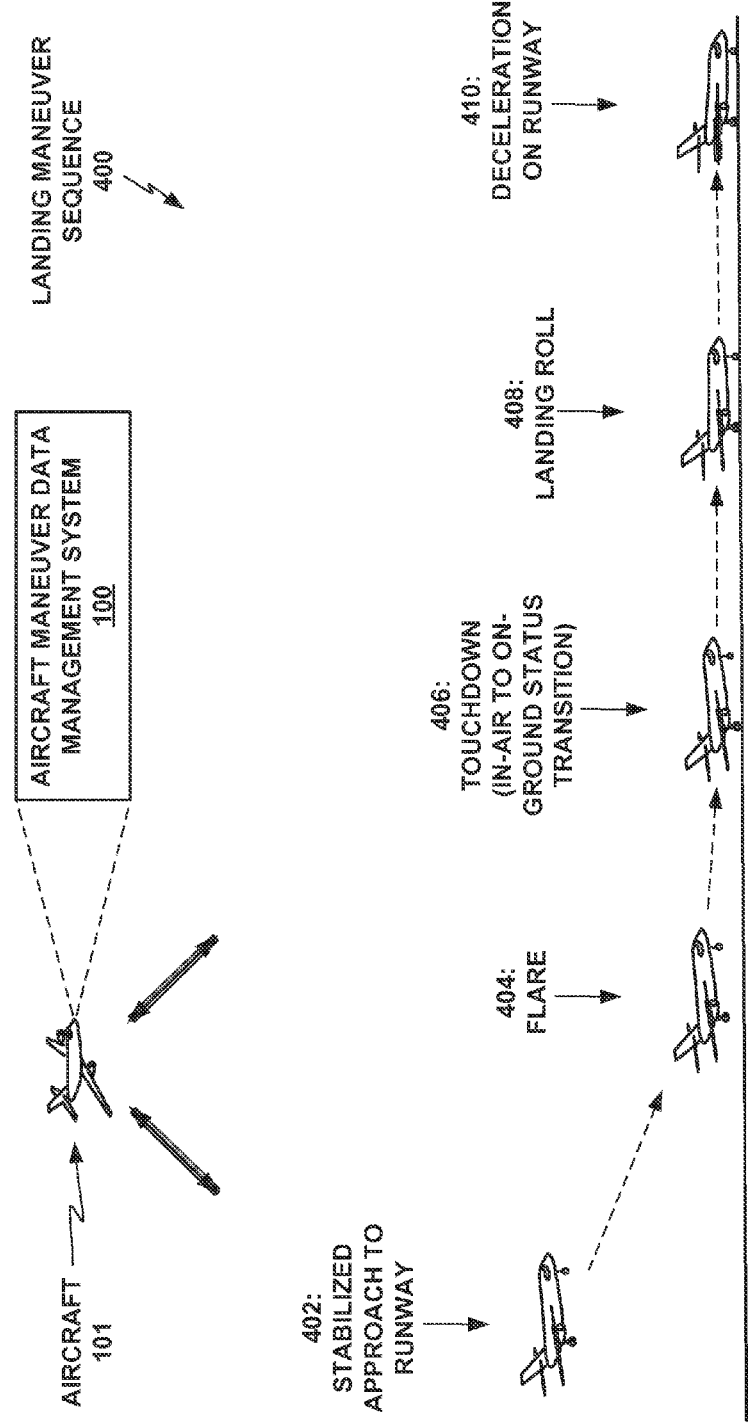
FIG. 4 depicts a conceptual diagram of an aircraft performing a landing maneuver sequence, during which the aircraft may transmit surveillance data to an aircraft maneuver data management system, in an example of this disclosure.

FIG. 4 depicts a conceptual diagram of aircraft 20 performing a landing maneuver sequence 400, during which aircraft 20 may transmit surveillance data to aircraft maneuver data management system 100 onboard aircraft 101, in an example of this disclosure. In landing maneuver sequence 400, aircraft 20 may perform a stabilized approach to a runway (402), and then perform a flare (404), i.e., a reduction in descent rate to level out to nearly horizontal flight just before landing to reduce the vertical speed at the moment of touchdown. Aircraft 20 then performs a touchdown (406), at the point in time when the main landing gear wheels first contact the runway, and transitions from in-air status to on-ground status. Aircraft 20 may then perform a landing roll (408), as it pitches forward about its main landing gear wheels to bring the nose landing gear wheels also into contact with the runway, and decelerates down the runway (410).

The transitions from in-air status to on-ground status may also be used as an important input for aircraft systems such as AMAS 220 of aircraft 101. Various sensors of aircraft 20 and potentially other sensors may transmit data to aircraft maneuver data management system 100 onboard aircraft 101 during landing maneuver sequence 400. In some examples, aircraft maneuver data management system 100 may determine status information related to the maneuvers of aircraft 20, such as the timing of the in-air status to on-ground status transition, potentially more accurately than aircraft 20 is capable of, and may communicate the more accurate maneuver status information to AMAS 220 of aircraft 101. Further examples and details of aircraft maneuver data management system 100 collecting data from an aircraft, analyzing the data, and generating an output based on the analysis of the data, such as to perform a more accurate determination of status transitions from on-ground to in-air status or in-air to on-ground status, are further presented below.

Figure 5:
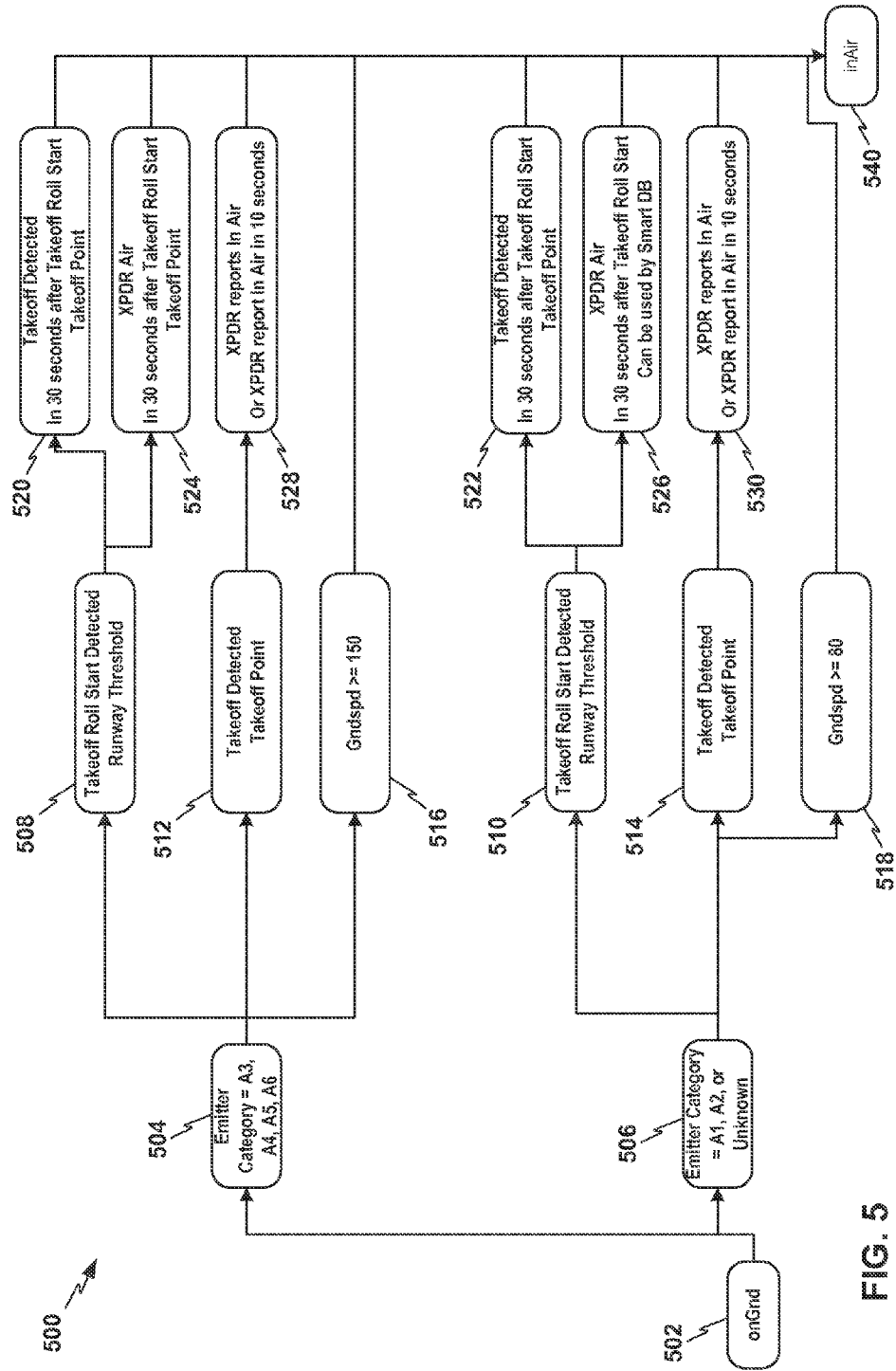
FIG. 5 shows a flowchart for a process that an aircraft maneuver data management system may implement, e.g., as an algorithm, to analyze surveillance data from an aircraft performing a takeoff maneuver sequence as shown in FIGS. 1 and 3, and to make an accurate determination of the time and position of maneuvers and status transitions of aircraft, such as at the point of takeoff roll start, takeoff, and/or the on-ground to in-air status transition of the aircraft, in an example of this disclosure.

FIG. 5 shows a flowchart for a process 500 that aircraft maneuver data management system 100 onboard aircraft 101 may implement, e.g., as an algorithm, to analyze surveillance data from aircraft 10 performing a takeoff maneuver sequence as shown in FIGS. 1 and 3, and to make an accurate determination of the time and position of maneuvers and status transitions of aircraft 10, such as at the point of takeoff roll start, takeoff, and/or the on-ground to in-air status transition of aircraft 10. In particular, aircraft maneuver data management system 100 may analyze aircraft maneuvers including takeoff roll start and takeoff (304 and 308 in takeoff maneuver sequence 300 in FIG. 3). Aircraft maneuver data management system 100 may collect and use data from aircraft 10 indicative of various variables or parameters of aircraft 10 and its motion and status, as further discussed below. Including compensation for potentially missing and/or erroneous data, aircraft maneuver data management system 100 may require or seek consistent indications over multiple instances of data to confirm data indicative of a takeoff roll start (potentially indicative of the runway threshold), takeoff, and/or transponder-reported on-ground to in-air status transition. Aircraft maneuver data management system 100 may perform analysis to determine parameters such as the takeoff point and the averaged track angle, and store those parameters in an aircraft maneuver database or other data store. Aircraft maneuver data management system 100 may communicate outputs to other systems and/or functions of aircraft 101 such as AMAS 220 of aircraft 101.

Aircraft maneuver data management system 100 may identify variables or parameters from the aircraft's surveillance data such as vertical acceleration and horizontal acceleration as factors in making maneuver determinations. Aircraft maneuver data management system 100 may further identify variables or parameters from the aircraft's surveillance data such as altitude, altitude rate, ground speed, and track angle, which may be used as secondary criteria in some examples, such as to rule out incorrect initial indications based on vertical acceleration and horizontal acceleration for at least some aircraft maneuvers. Using primarily data for horizontal and vertical accelerations as opposed to speed components may be advantageous for at least some aircraft maneuvers in reducing or eliminating inaccuracies due to wind impact on speed components, in some examples.

For example, maneuver detection for large airplanes' surveillance data (e.g., aircraft emitter categories A3 to A6) may be stored in a liner memory buffer, where T indicates or indexes current data, T−1 indicates data in the previous second, and so forth, such that T−n indicates data recorded n seconds previously. The data storage may be based on time interval and not on data validity, because the duration of a maneuver is usually limited, such that if data is missing or erroneous during a brief window for recording a certain type of data for a given time slot, then invalid data may be recorded for that data slot. Aircraft maneuver data management system 100 may be enabled to compensate for such erroneous data in a way that other aircraft systems may not be.

In the example of FIG. 5, aircraft 10 may begin with on on-ground status (502). Aircraft maneuver data management system 100 may receive surveillance data for aircraft 10. Aircraft maneuver data management system 100 may first determine whether aircraft 10 is a large aircraft (e.g., a commercial aviation aircraft) or a small aircraft (e.g., a general aviation aircraft) or of unknown size. It may be appropriate for aircraft maneuver data management system 100 to apply different logic and thresholds to different aircraft categories to account for different flying characteristics and equipage differences between large and small aircraft. As a particular example, aircraft maneuver data management system 100 may first determine whether aircraft 10 is in ADS-B emitter category A3, A4, A5, or A6 (504) or in ADS-B emitter category A1, A2, or unknown (506).

Aircraft maneuver data management system 100 may then attempt to detect data indicating a takeoff roll start (508, 510) of the aircraft, and correlate the aircraft's position at that point with the runway threshold of the runway. Aircraft maneuver data management system 100 may also attempt to detect data indicating the takeoff (512, 514) of the aircraft, and correlate the aircraft's position at that point in time with the takeoff point. In another alternative, aircraft maneuver data management system 100 may attempt to detect when aircraft 10 reaches or exceeds a threshold ground speed, e.g., 150 knots for a large aircraft (516) or 80 knots for a small aircraft (518) in this example, and determine that the aircraft 10 is airborne and has transitioned to in-air status (540) based on this ground speed determination. Aircraft maneuver data management system 100 may seek to detect either of these three conditions as alternatives due to the potential for data indicating certain maneuvers such as takeoff roll start or takeoff to be lost in transmission or erroneously omitted from surveillance data transmissions by the aircraft systems of aircraft 10, for example.

If aircraft maneuver data management system 100 detected data indicating a takeoff roll start (508, 510) of the aircraft, aircraft maneuver data management system 100 may then seek to detect data indicative of takeoff within 30 seconds after the takeoff roll start (520, 522). Alternatively, aircraft maneuver data management system 100 may then seek to detect data indicative of the transponder of aircraft 10 reporting in-air status within 30 seconds after the takeoff roll start (524, 526). In either case, aircraft maneuver data management system 100 may correlate or designate the aircraft's position at that point in time with a takeoff point, and may determine that aircraft 10 is in the in-air status (540). If aircraft maneuver data management system 100 detected the takeoff point directly (512), aircraft maneuver data management system 100 may then seek to detect aircraft 10 reporting in-air status, either at all or within 10 seconds after the takeoff (528, 530). Aircraft maneuver data management system 100 may then determine that aircraft 10 is in the in-air status (540).

The analysis of the aircraft maneuvers in process 500 may be done over a set of data that may contribute to accurate maneuver detections and status determinations by enabling compensating for some instances of lost or erroneous data. For example, aircraft maneuver data management system 100 may require a threshold number such as two or more instances of data received for a given maneuver status (e.g., takeoff roll start, takeoff, transponder in-air signal) within a determined span of time to validate the given maneuver status, as opposed to a potentially erroneous signal. In other examples, aircraft maneuver data management system 100 may use variations on process 500 of FIG. 5 with any of a wide variety of other implementation details. For example, aircraft maneuver data management system 100 may also apply speed references to the maneuver analysis to further constrain the analysis logic to realistic maneuver scenarios, which may further compensate for or filter out erroneous data in some examples.

As noted above, aircraft maneuver data management system 100 may use data from aircraft 10 indicative of any of a variety of motions and parameters of the aircraft 10. These may include altitude, rate of change of altitude, delta of rate of change of altitude (or acceleration in altitude component), ground speed, delta of ground speed (or ground speed acceleration component), and track angle (direction of speed). These parameters may be measured in units as shown in Table 1:

TABLE 1

Parameters measured for aircraft maneuver detection

| Parameter | Unit |
| --- | --- |
| Attitude | ft |
| Altitude Rate | FPM |
| Delta Alt Rate/Vertical Acceleration | FPM/s |
| Gild Speed | Kt |
| Delta Gnd Spd/Horizontal Acceleration | Kt/s |
| Track Angle | Degree |

Aircraft maneuver data management system 100 may receive the data for these parameters from aircraft 10 in the surveillance data broadcast by aircraft 10, e.g., in ADS-B messages. The data from the aircraft may be available from transponders compliant with the DO-260/DO-282 or later standards as promulgated by the Radio Technical Commission for Aeronautics (RTCA), Inc. The data quality may conform to eligibility conditions under the DO-317 standard for Enhanced Traffic Situational Awareness during Flight Operations (ATSA-AIRB) and/or Enhanced Traffic Situational Awareness on Airport Surface (ATSA-SURF). Data on the vertical rate or altitude rate may be collected and used directly to encourage better accuracy in the data analysis by aircraft maneuver data management system 100 as opposed to the option of a derived value. As noted above, the signal reception of the ADS-B data may be poor when the target aircraft 10 is close to an airport surface, but the analysis by aircraft maneuver data management system 100 such as in process 500 may be arranged to compensate for losses or discontinuities in some of the data. In various examples, aircraft maneuver data management system 100 may apply advanced matched filters or simple but robust linear filters to the incoming surveillance data from aircraft 10. Variations on the algorithms applied and the supporting inputs may result in different false detection or missed detection rates. Aircraft maneuver data management system 100 may apply different algorithms in different applications based on factors such as application criticality that it supports and platform capability that hosts the functionality. The aircraft maneuver data may be used for any of various applications such as a "maneuver database" of airport runway geography, as further discussed below.

In some examples, aircraft maneuver data management system 100 may collect surveillance data in the form of ADS-B data, which may also be used to derive parameters such as vertical and horizontal acceleration. The ADS-B data may be from either or both of 1090 MHz and 978 MHz ADS-B transmission formats. In various examples, aircraft maneuver data management system 100 may also collect aircraft data in other forms such as wind speed and direction, outside air temperature (OAT), and baro-setting, and may collect data via other formats of surveillance data, such as ADS-R, TIS-B, and FIS-B. Further examples of processes or algorithms for Aircraft Maneuver Recognition with Surveillance Information are provided below. Various example algorithms may include a variety of thresholds or criteria appropriate for a variety of applications.

In some examples, process 500 or other processes or algorithms may enable aircraft maneuver data management system 100 to identify aircraft maneuvers of air traffic in the vicinity of an airport or runway, and may store the aircraft maneuver data in a "maneuver database" module, subsystem, memory array, data store, or program, which may enable improving runway identification performance, by accurately determining air/ground status transition points and runway thresholds. Aircraft maneuver data management system 100 may collect and analyze aircraft maneuver data from multiple runways and multiple airports, and generate outputs characterizing air/ground status transition points and runway thresholds at each of the multiple runways and multiple airports.

An illustrative example of algorithm parameters that aircraft maneuver data management system 100 may apply to detect a takeoff roll start (304) are presented below in Tables 2 and 3, which may represent a data buffer of surveillance data for an aircraft for a time series that aircraft maneuver data management system 100 divides into initial time counts, and then subsequent time counts that are subsequent to the time of the maneuver (takeoff roll start in the example of Tables 2 and 3), in examples for a large aircraft (Table 2 below, 508 in FIG. 5) and for a small aircraft (Table 3 below, 510 in FIG. 5) (all in the units as in Table 1 above):

TABLE 2

Detection of take off roll start for large aircraft (e.g., categories A3-A6)

| Parameter | Initial data slots | Subsequent data slots |
|---|---|---|
| Alt | if available, abs(T0-Tm) <= 100 | |
| Altitude Rate | if available, alt rate = (>=80%) | |
| Delta Alt Rate | N/A | |
| Gnd Speed | >=30% available | >=30% available, <=30 kt (100%) |
| Delta Gnd Spd | Average >= 3, >=0 (100%) | Average <= 1 |
| Track Angle | Standard deviation <= 1.5 deg | N/A |

Thus, in this example, aircraft maneuver data management system 100 may detect data on the ground speed, horizontal acceleration (delta ground speed), and track angle, and potentially also altitude and altitude rate in some examples, from the aircraft's surveillance data. For the initial time counts, when the aircraft is in on-ground status, aircraft maneuver data management system 100 may primarily use horizontal acceleration conditions to validate the data, and perform analysis to determine that horizontal acceleration is greater than or equal to zero for 100% of values (e.g., at one value per second or one hertz) and that the average of the values of horizontal acceleration is greater than or equal to 3 knots per second. Aircraft maneuver data management system 100 may also confirm that greater than or equal to 30% of the ground speed data values are available (e.g., no unusual dearth of data), and that the standard deviation of the track angle (or vector direction of speed of the aircraft) is less than or equal to 1.5 degrees (e.g., to confirm that the aircraft is not experiencing significant changes in pitch angle, consistent with being on the ground). In some examples, aircraft maneuver data management system 100 may also perform analysis of the altitude and altitude rate data to determine if the difference in altitude between data time slots (e.g., in intervals of seconds) from the initial time T0 to the time of the maneuver Tm is less than a threshold (e.g., 100 feet) (e.g., consistent with the aircraft remaining on the ground and not changing in altitude), and that the altitude rate is 0 for at least a minimum number of data slots, e.g., at least 80%, rather than 100% to be tolerant of some exceptions to compensate for erroneous data, such as bumps in the runway.

Aircraft maneuver data management system 100 may then detect the takeoff roll start, which it may correlate with the transition from the initial data slots and confirm the takeoff roll start by confirming that certain conditions prevail during the subsequent time slots. In particular, aircraft maneuver data management system 100 may determine if average horizontal acceleration less than or equal to 1 knot per second, and ground speed is less than or equal to 30 knots, which may correlate with takeoff roll start in some examples. Aircraft maneuver data management system 100 may apply similar criteria for small aircraft except applying a lower average horizontal acceleration and higher threshold of variation in track angle in identifying the prerequisite data slots, as in Table 3:

TABLE 3

Detection of takeoff roll start for small aircraft (e.g., categories A1, A2, and unknown)

| Parameter | Initial data slots | Subsequent data slots |
|---|---|---|
| Alt | if available, abs(T0-Tn) <= 100 | |
| Altitude Rate | if available, -64 <= alt rate <= 64 (100%) | |
| Delta Alt Rate | N/A | |
| Gnd Speed | >=30% available | >=30% available, <=30 kt (100%) |
| Delta Gnd Spd | Average >= 1.5, >=0 (100%) | Average <= 2 |
| Track Angle | Standard deviation <= 2 deg | N/A |

Aircraft maneuver data management system 100 may also apply criteria for detecting the point in time of takeoff roll start as the first absolute value of (Track Angle−average Track Angle (T0 to Tn))<=2.5.

Aircraft maneuver data management system 100 may apply a different set of criteria to identify prerequisite and subsequent data slots before and after a time identified with a takeoff maneuver, as shown in examples below for large aircraft in Table 4 and for small aircraft in Table 5:

TABLE 4

Detection of takeoff for large aircraft (e.g., categories A3-A6)

| Parameter | Initial data slots | Subsequent data slots |
|---|---|---|
| Alt | >=30% available | if available, abs(Tm-Ts) <= 100 |
| Altitude Rate | >=30% points available, alt rate >= 0(100%), T0 >= 1500 | if available, -64 <= alt rate <= 64 (>=80%) |
| Delta Alt Rate | >=300 (>=30%), >=150 (>=80%), >=0(100%) | N/A |

TABLE 4-continued

Detection of takeoff for large aircraft (e.g., categories A3-A6)

| Parameter | Initial data slots | Subsequent data slots |
|---|---|---|
| Gnd Speed | average >= 80 | >=30% points available, >=30 (100%) |
| Delta Gad Spd | N/A | average >= 2.8 |
| Track Angle | N/A | Standard deviation <= 1.5 deg |

TABLE 5

Detection of takeoff for small aircraft (e.g., categories A1, A2, and unknown)

| Parameter | Initial data slots | Subsequent data slots |
|---|---|---|
| Alt | >=30% available | if available, abs(Tm-Ts) <= 100 |
| Altitude Rate | >=30% points available, alt rate >= 0(100%), T0 >= 128 | if available, −64 <= alt rate <= 64 (>=60%) |
| Delta Alt Rate | >=32 (>=20%), >=16 (>=40%), >=0(80%) | N/A |
| Gnd Speed | average >= 50 | >=20% points available, average >= 30 |
| Delta Gnd Spd. | N/A | average >= 1.5, >=0 (100%) OR average (Tm to Ts) >= 1.9 |
| Track Angle | N/A | Standard deviation <= 2 deg |

Figure 6:
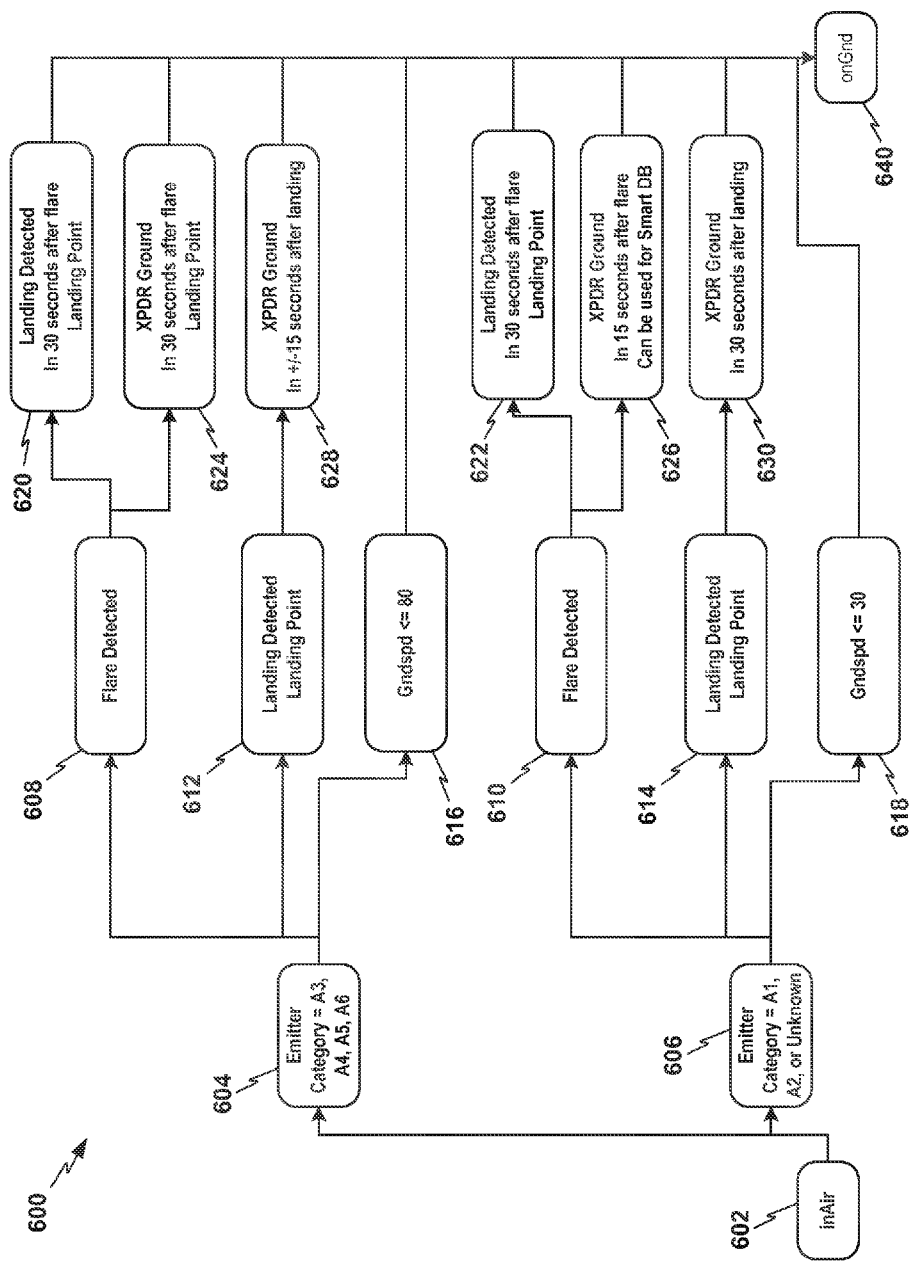
FIG. 6 shows a flowchart for a process that an aircraft maneuver data management system may implement, e.g., as an algorithm, to analyze data from an aircraft performing a landing maneuver sequence as shown in FIGS. 1 and 4, and to generate as an output an accurate determination of the time and position of the aircraft at the point of landing and/or the in-air to on-ground status transition of aircraft, in an example of this disclosure.

FIG. 6 shows a flowchart for a process 600 that aircraft maneuver data management system 100 may implement, e.g., as an algorithm, to analyze data from other target aircraft 20 performing a landing maneuver sequence as shown in FIGS. 1 and 4, and to generate as an output an accurate determination of the time and position of aircraft 20 at the point of landing and/or the in-air to on-ground status transition of aircraft 20. In particular, aircraft maneuver data management system 100 may analyze aircraft maneuvers including flare and touchdown (404 and 406 in takeoff maneuver sequence 300 in FIG. 3). Aircraft maneuver data management system 100 may collect and use data from aircraft 20 indicative of various variables or parameters of aircraft 20 and its motion and status, as further discussed below. Including compensation for potentially missing and/or erroneous data, aircraft maneuver data management system 100 may require or seek consistent indications over multiple instances of data to confirm data indicative of a flare, landing, and/or transponder-reported in-air to on-ground status transition. Aircraft maneuver data management system 100 may perform analysis to determine parameters such as the landing point and the averaged track angle, and store those parameters in an aircraft maneuver data store. Aircraft maneuver data management system 100 may communicate the output to other systems and/or functions of aircraft 101 such as AMAS 220 of aircraft 101.

In the example of FIG. 6, aircraft 20 may begin with on in-air status (602) as it may make a stabilized approach to landing (e.g., as in 402 in landing maneuver sequence 400 of FIG. 4). Aircraft maneuver data management system 100 may receive surveillance data for aircraft 20. As in the takeoff maneuver sequence described above, aircraft maneuver data management system 100 may first determine whether aircraft 20 is a large aircraft (e.g., a commercial aviation aircraft) or a small aircraft or of unknown size (e.g., a general aviation aircraft). It may be appropriate for aircraft maneuver data management system 100 to apply different logic and thresholds to different aircraft categories to account for different flying characteristics and equipage differences between large and small aircraft. As a particular example, aircraft maneuver data management system 100 may first determine whether aircraft 20 is in ADS-B emitter category A3, A4, A5, or A6 (604) or in ADS-B emitter category A1, A2, or unknown (606).

Aircraft maneuver data management system 100 may then attempt to detect data indicating a flare (608, 610) of the aircraft (e.g., as at 404 in FIG. 4). Aircraft maneuver data management system 100 may also attempt to detect data indicating the landing (612, 614) of the aircraft (as at 406 in FIG. 4), and correlate the aircraft's position at that point in time with the landing point. In another alternative, aircraft maneuver data management system 100 may attempt to detect when aircraft 20 reaches or falls below a threshold ground speed, e.g., 80 knots for a large aircraft (616) or 30 knots for a small aircraft (618) in this example, and determine that the aircraft 20 has landed and has transitioned to on-ground status (640) based on this ground speed determination. Aircraft maneuver data management system 100 may seek to detect either of these three conditions as alternatives due to the potential for data indicating certain maneuvers such as flare or landing to be lost in transmission or erroneously omitted by the aircraft systems, for example.

If aircraft maneuver data management system 100 detected data indicating a flare (608, 610) of the aircraft, aircraft maneuver data management system 100 may then seek to detect data indicative of landing within 30 seconds after the flare (620, 622). Alternatively, aircraft maneuver data management system 100 may then seek to detect data indicative of the transponder of aircraft 20 reporting on-ground status within 30 seconds after the flare, for large aircraft (624), or within 15 seconds after the flare, for small aircraft (626). In either case, aircraft maneuver data management system 100 may correlate or designate the aircraft's position at that point in time with a landing point, and may determine that aircraft 10 is in the on-ground status (640). If aircraft maneuver data management system 100 detected the landing point directly (612, 614), aircraft maneuver data management system 100 may then seek to detect the transponder of aircraft 20 reporting on-ground status within plus or minus 15 seconds after the landing, for large aircraft (628), or within 30 seconds after landing, for small aircraft (630). Aircraft maneuver data management system 100 may then determine that aircraft 20 is in the on-ground status (640).

The analysis of the aircraft maneuvers in process 600 may be done over a set of data that may contribute to accurate maneuver detections and status determinations by enabling compensating for some instances of lost or erroneous data. For example, aircraft maneuver data management system 100 may require a threshold number such as two or more instances of data received for a given maneuver status (e.g., flare, landing, transponder on-ground status signal) within a determined span of time to validate the given maneuver status, as opposed to a potentially erroneous signal. In other examples, aircraft maneuver data management system 100 may use variations on process 600 of FIG. 6 with any of a wide variety of other implementation details. For example, aircraft maneuver data management system 100 may also apply speed references to the maneuver analysis to further constrain the analysis logic to realistic maneuver scenarios, which may further compensate for or filter out erroneous data in some examples.

Thus, aircraft maneuver data management system 100 may apply a set of criteria to identify prerequisite and subsequent data slots before and after a time identified with a flare maneuver, as shown in examples below for large aircraft in Table 6 and for small aircraft in Table 7:

TABLE 6

Detection of flare for large aircraft (e.g., categories A-A6)

| Parameter | Initial data slots | Subsequent data slots |
|---|---|---|
| Alt | >=30% available, T0-Tm <= 0 | 30% available, Tm-Ts <= −100 |
| Altitude Rate | >=30% available, <0(>=80%) | average <= −500 FPM, <= 0 (100%) |
| Delta. Alt Rate | average >= 40 | 30 >= average >= −30 |
| Gnd Speed | >=30% available, 80 <= average <= 200 | >=30% available, 100 <= average <= 200 |
| Delta Gnd Spd | average <= 0.5 | 0.5 >= average >= −0.5 |
| Track Angle | standard deviation < 5 | standard deviation < 2 |

TABLE 7

Detection of flare for small aircraft (e.g., categories A1-A2, and unknown)

| Parameter | Initial data slots | Subsequent data slots |
|---|---|---|
| Alt | >=30% available, T0-T7 <= 0 | 30% available, T8-T19 <= −50 |
| Altitude Rate | >=30% available, <0(>=80%) | average <= −256 FPM, <=0 (100%) |
| Delta Alt Rate | average >= 30 | 30 >= average >= −30 |
| Gnd Speed | >=30% available, 30 <= average <= 200 | >=30% available, 50 <= average <= 200 |
| Delta Gnd Spd | average <= 0.5 | 1 >= average >= −1 |
| Track Angle | standard deviation < 5 | standard deviation < 2 |

For all directly received data, availability may be defined for the segment of data slots; for example, >=30% availability means at least 30% of the data slots in the associated segment of time-ordered data slots contain valid data in order to run the algorithm effectively, in this example. In the altitude segment, initial time T0 minus time of maneuver Tm<=0 requires the difference between the latest valid data and the oldest valid data to indicate the airplane is not climbing. For altitude rate, <0(>=80%) means that among all valid data in the segment of data slots, at least 80% of the data slots indicate the aircraft is descending. Delta altitude rate average >=40 requires the derived vertical acceleration in the segment of data slots from reported altitude rate and associated timestamp have a positive averaging value greater than or equal to 40. Standard deviation <5 for track angle requires a relatively stable directional control.

Aircraft maneuver data management system 100 may apply another set of criteria to identify prerequisite and subsequent data slots before and after a time identified with a landing touchdown maneuver, as shown below in examples for large aircraft in Table 8 and for small aircraft in Table 9:

TABLE 8

Detection of landing for large aircraft (e.g., categories A3-A6)

| Parameter | Initial data slots | Subsequent data slots |
|---|---|---|
| Alt | if available, −25 <= T0-T11 <= 25 | >=30% available, T12-T19 <= 100 |
| Altitude Rate | if available, 0 <= alt rate <= 64 (100%) | >=30% points available, alt rate <= 64 (100%) |
| Delta Alt Rate | N/A | >=30 (>=20%), >=−100 (>=80%) |
| Gnd Speed | >=30% points available | >=30% available, 80 <= average <= 200 |
| Delta Gnd Spd | average <= −2.5, <=0 (100%) | average <= 0.5 |
| Track Angle | Standard deviation <= 1.5 | Standard deviation <= 5 |

TABLE 9

Detection of landing for small aircraft (e.g., categories A1, A2, and unknown)

| Parameter | Initial data slots | Subsequent data slots |
|---|---|---|
| Alt | if available, −100 <= T0-T7 <= 100 | >=30% available, T8-T19 <= 100 |
| Altitude Rate | if available, −64 < alt rate < 64 (100%) | >=30% points available, alt rate <= 64 (100%) |
| Delta Alt Rate | N/A | >=32 (>=20%) |
| Gnd Speed | average >= 0.2, T0 <= 75 | >=30% available, 30 <= average <= 200 |
| Delta Gnd Spd | average <= −0.5, <=−1 (>=20%), <=1 (100%) | average <= 0.5 |
| Track Angle | Standard deviation <= 2 | Standard deviation <= 5 |

As FIGS. 5 and 6 show, aircraft maneuver data management system 100 may also apply alternative criteria to detect status transitions (e.g., on-ground to in-air or vice versa) in case lost or erroneous data results in the loss of detection of one maneuver, e.g., for detecting a takeoff maneuver without having first detected a takeoff roll start (512, 514); for detecting in-air status transition without detecting takeoff (516, 518); for detecting a landing maneuver without first detecting a flare maneuver (612, 614); or for detecting an on-ground status transition without first detecting a landing (616, 618). For example, if aircraft maneuver data management system 100 detects a landing maneuver without first detecting a flare maneuver (612, 614), and transponder air to ground transition is received within +/−15 seconds around the landing (for large aircraft) (628) or in the next 30 seconds after landing (for small or unknown category aircraft) (630), aircraft maneuver data management system 100 determines that an air-to-ground status transition has occurred, and associates a landing position upon the landing maneuver.

In case aircraft maneuver data management system 100 misses both flare and landing maneuvers due to lost, distorted, or erroneous data, aircraft maneuver data management system 100 may determine that the aircraft's status has transitioned to on-ground status (640) based on determining that the aircraft's ground speed is less than 80 knots (for a large aircraft) (616) or less than 30 knots (for small or unknown category aircraft) (618). Aircraft maneuver data management system 100 may apply a certain hysteresis to avoid flips in implementation, e.g., include past determinations of maneuvers or status transitions as another criterion for determining a maneuver or status transition.

Aircraft maneuver data management system 100 may enable a variety of applications with its collection of stored data on maneuvers of numerous aircraft. Examples of applications are a "maneuver database" of airports and runways, wake vortex turbulence avoidance, and enhanced Traffic Situation Awareness with Alerts (TSAA), as further explained below.

Aircraft maneuver data management system 100 may build a "maneuver database" based on aircraft maneuver data such as takeoff and landing sequence data and the positions of takeoffs and landings on runways as determined by aircraft maneuver data management system 100. In some examples, aircraft maneuver data management system 100 may add the aircraft maneuver data to an existing "smart database" program of airport runway information. Aircraft maneuver data management system 100 may re-create runway geometries based on the system's algorithmic processing of the maneuver data, which may be more reliable than reported status transitions as reported by aircraft transponders, which may be more prone to status determination mechanism errors and lost or erroneous data. Aircraft-based status determination mechanisms may be fooled by bumps on the runway or may fail to record a valid on-ground/in-air status transition due to a missed reference point or runway identification. Aircraft maneuver data management system 100 may enable more sophisticated logic that may filter out or compensate for lost or erroneous data, as described above. Aircraft maneuver data management system 100 may provide its "maneuver database" runway geometry and runway threshold information as input data to various other applications, such as a "smart pattern" air traffic and aircraft trajectory management system or an air traffic system using procedural trajectory prediction.

Aircraft maneuver data management system 100 may also enable or support methods of wake vortex turbulence avoidance in runway operations. This may involve using aircraft on-ground and in-air status to generate wake vortex turbulence avoidance alerts, to make sure trailing airplanes stay at or above a leading large airplane's flight path, which includes identifying the leading airplane's touchdown points and rotation points. Aircraft maneuver data management system 100 may detect and track the maneuvers and the in-air/on-ground status of target aircraft accurately, as described above. Aircraft maneuver data management system 100 may thus enable more reliable avoidance of wake vortex turbulence.

The TSAA protocol is defined in RTCA DO-317B to predict air traffic and an own aircraft's trajectory and run logic to generate alert for potential conflicts. The trajectory prediction plays a substantial role in supporting new collision avoidance algorithms that may be more efficient than traditional Traffic Collision Avoidance System (TCAS). However, TSAA uses trajectory propagation based on constant track angle rates, which improves alerting performance more than some methods but may still result in significant nuisance alerts and missed alert rates. Aircraft maneuver data management system 100 may enable an enhanced "smart pattern" method to predict air traffic trajectories by combining aircraft maneuver data with knowledge of aeronautical procedures in airport traffic pattern environment and other areas where predefined procedures are well established. Aircraft maneuver data management system 100 may thus enhance the performance of TSAA air traffic alerting systems.

For example, a standard TSAA system that detects a flare-like maneuver (stabilized vertical path and speed followed by a sudden level out at very low altitude) over a remote area (determined by a terrain database and an airport database) may normally still interpret the maneuver as a standard flare preparatory to landing, and predict the aircraft will follow a level flight for the next half minute or so. Aircraft maneuver data management system 100 may instead apply sophisticated logic to determine that the flare maneuver is in a remote area and not proximate to a runway and that the maneuver is instead likely a pilot practicing a low approach maneuver or a simulated engine failure. Aircraft maneuver data management system 100 may thus predict that the aircraft will make a sudden climb up instead of maintain a level flight, and populate a predicted trajectory with a high vertical rate. Aircraft maneuver data management system 100 may thus provide a superior alert lead time compared to a traditional maneuver based prediction alerting system. Aircraft maneuver data management system 100 may also communicate outputs to an Air Traffic Control (ATC) entity, an aircraft operator entity, and/or a particular aircraft among the plurality of aircraft, in various examples.

In some examples, multiple implementations of an aircraft maneuver data management system 100 onboard multiple aircraft may also load data from one to another or share data with each other. This may enable increasing the amount and accuracy of maneuver data available for each aircraft type. In some examples, and aircraft maneuver data management system 100 may also be implemented off of any individual aircraft, such as in a ground-based global air transport services system, a ground-based aircraft fleet operator system, or an Air Traffic Control (ATC) system. In such implementations separate from an individual aircraft, an off-aircraft aircraft maneuver data management system 100 may receive maneuver data directly from cooperative surveillance data broadcast from individual aircraft, and/or from onboard aircraft maneuver data management systems onboard the multiple aircraft. An off-aircraft aircraft maneuver data management system 100 may then communicate data or information to aircraft systems or for other systems or functions based on the stored maneuver data.

Figure 7:
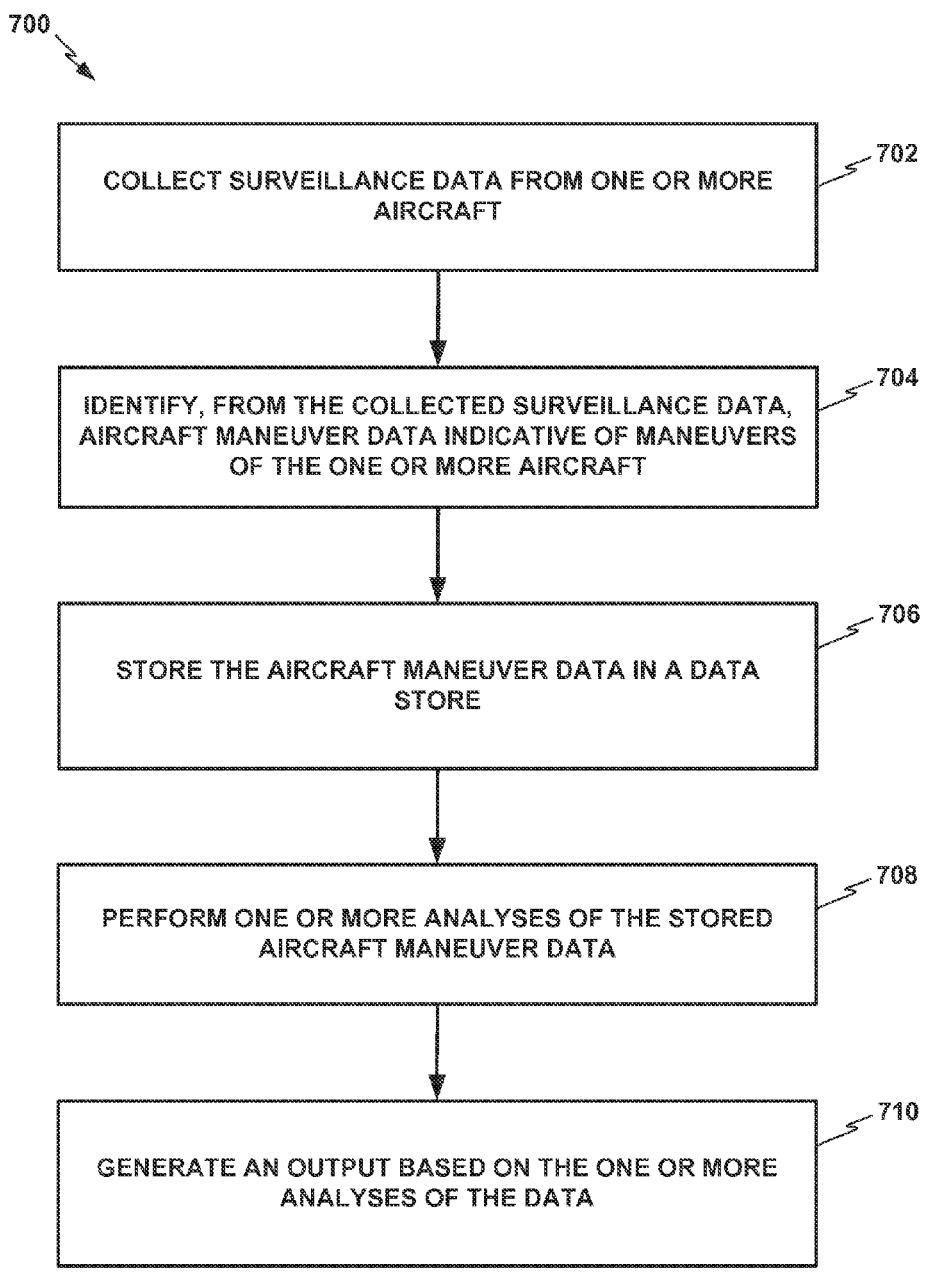
FIG. 7 shows a flowchart for a method that an aircraft maneuver data management system, as shown in FIG. 1 and described with reference to FIGS. 1-6, may perform in some examples.

FIG. 7 shows a flowchart for a method 700 that an aircraft maneuver data management system 100, as shown in FIG. 1 and described above with reference to FIGS. 1-6, may perform in some examples. Aircraft maneuver data management system 100 may collect surveillance data from one or more aircraft (702). Aircraft maneuver data management system 100 may further identify, from the collected surveillance data, aircraft maneuver data indicative of maneuvers of the one or more aircraft (704) (e.g., identifying the aircraft maneuver data indicative of the aircraft maneuvers may include deriving or determining the aircraft maneuvers based on the received surveillance data as described above, including with respect to FIGS. 5 and 6). Aircraft maneuver data management system 100 may further store the aircraft maneuver data in a data store (706). Aircraft maneuver data management system 100 may further perform one or more analyses of the stored aircraft maneuver data in the data store (708). Aircraft maneuver data management system 100 may further generate an output based on the one or more analyses of the stored aircraft maneuver data (710).

The techniques of this disclosure may be implemented in a device, an article of manufacture comprising a computer-readable storage medium, and/or any of a wide variety of computing devices. Any components, modules or units have been described to emphasize functional aspects and do not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The term "processor," as used herein may refer to any of the foregoing structure or any other structure suitable for processing program code and/or data or otherwise implementing the techniques described herein. Elements of aircraft maneuver data management system 100 and/or processors 102 thereof, and/or system elements for executing and/or storing aircraft maneuver data management module 110 or features thereof as disclosed above, may be implemented in any of a variety of types of solid state circuit elements, such as magnetic nonvolatile random-access memory (RAM) or other types of memory, a mixed-signal integrated circuit, CPUs. CPU cores, GPUs, digital signal processors (DSPs), application-specific integrated circuits (ASICs), a magnetic nonvolatile RAM or other types of memory, a mixed-signal integrated circuit, a field programmable gate array (FPGA), a microcontroller, a programmable logic controller (PLC), a programmable logic device (PLD), a complex programmable logic device (CPLD), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 104 may include any volatile or non-volatile media, such as a RAM, ROM, non-volatile RAM (NVRAM), electrically erasable programmable ROM (EEPROM), flash memory, and the like. One or more memory devices 104 may store computer readable instructions that, when executed by one or more processors 102, cause the one or more processors 102 to implement the techniques attributed herein to aircraft maneuver data management module 110.

Elements of aircraft maneuver data management module 110 may be programmed with various forms of software. Aircraft maneuver data management module 110 may be implemented at least in part as, or include, one or more executable applications, application modules, libraries, classes, methods, objects, routines, subroutines, firmware, and/or embedded code, for example. Elements of aircraft maneuver data management module 110 as in any of the examples herein may be implemented as a device, a system, an apparatus, and may embody or implement a method of collecting, analyzing, processing, synthesizing, and outputting aircraft maneuver and status data, including for implementing example methods 500 and 600 as described with reference to FIGS. 5 and 6.

Aircraft maneuver data management unit 110 may in some examples be implemented at least in part as a software package or software library comprising computer-executable instructions stored on and/or executed by processors 102 of aircraft maneuver data management system 100, as well as data stored and/or processed at least in part by processors 102. Aircraft maneuver data management unit 110 may also be implemented in hardware or firmware in some examples. Aircraft maneuver data management system 100 may also include various other systems and components beyond those shown in FIG. 1 and described above.

In any of the above examples, aircraft maneuver data management unit 110 may be implemented using executable software instructions. In some examples, aircraft maneuver data management unit 110 may be a portion of a larger set of executable software instructions which may be executed by processing hardware of aircraft maneuver data management unit 110. Aircraft maneuver data management unit 110 may be implemented as portions of executable software instructions, and/or with embedded firmware and/or specialized hardware elements. In some examples, aircraft maneuver data management unit 110 of aircraft maneuver data management unit 110 may be implemented with at least some functions implemented in embedded firmware, one or more graphical processing units (GPUs), one or more field programmable gate array (FPGAs), one or more application-specific integrated circuits (ASICs), or other specialized hardware.

An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft). Various types of aircraft may use different types of surveillance data systems and may have different maneuver characteristics, which may be used and accounted for by aircraft maneuver data management system 100. While some examples are described in terms of aircraft maneuver data management system 100 receiving surveillance data from various aircraft and transmitting aircraft maneuver and status data to various aircraft, in other examples, aircraft maneuver data management system 100 may communicate aircraft maneuver and status data outputs any other type of system, component, device, software module, computer, or other feature that may use the data for other purposes.

Various aspects of the disclosure have been described. These and other aspects are within the scope of the following claims.

What is claimed is:

1. A system comprising:
   one or more memory devices; and
   one or more processors operably coupled to the one or more memory devices, wherein the one or more processors are configured to:
   receive surveillance data collected from one or more aircraft;
   identify, from the collected surveillance data, aircraft maneuver data indicative of maneuvers of the one or more aircraft;
   store the aircraft maneuver data in a data store;
   perform one or more analyses of the stored aircraft maneuver data in the data store; and
   generate an alerting output based on the one or more analyses of the stored aircraft maneuver data.

2. The system of claim 1, wherein the aircraft maneuver data comprises data indicative of takeoff and landing maneuvers of the one or more aircraft.

3. The system of claim 2, wherein identifying the data indicative of the takeoff and landing maneuvers of the one or more aircraft from the collected surveillance data comprises identifying data from the collected surveillance data indicative of at least one of a flare, a touchdown, and a landing roll of each of one or more of the aircraft performing a landing, and at least one of a takeoff roll start, a takeoff roll, and a takeoff of each of one or more of the aircraft performing a takeoff.

4. The system of claim 1, wherein generating the alerting output based on the one or more analyses of the stored aircraft maneuver data comprises generating an air traffic procedural trajectory prediction alerting output.

5. The system of claim 1, wherein generating the alerting output based on the one or more analyses of the stored aircraft maneuver data comprises generating a wake vortex turbulence avoidance alerting output.

6. The system of claim 1, wherein generating the alerting output based on the one or more analyses of the stored aircraft maneuver data comprises generating an enhanced Traffic Situation Awareness and Alert (TSAA) output.

7. The system of claim 1, wherein the data store comprises an airport runway geography database.

8. The system of claim 1, wherein the one or more processors are further configured to organize the stored takeoff and landing maneuver data in association with airports and runways on which the takeoff and landing maneuvers of the one or more aircraft were performed.

9. The system of claim 8, wherein the one or more processors are further configured to:
   perform a statistical analysis of the takeoff and landing maneuvers for each of one or more runways; and
   generate an output based on the statistical analysis.

10. The system of claim 9, wherein the one or more processors are further configured to determine runway thresholds for one or more of the runways based on the statistical analysis of the takeoff and landing maneuvers for each of one or more runways.

11. The system of claim 1, wherein the one or more processors are further configured to communicate the alerting output to an Air Traffic Control (ATC) entity.

12. The system of claim 1, wherein the one or more processors are further configured to communicate the alerting output to an aircraft operator entity.

13. The system of claim 1, wherein the system is installed on an aircraft, and wherein the one or more processors are further configured to communicate the output to an airport geography database system of the aircraft.

14. The system of claim 1, wherein the one or more processors are further configured to determine if a particular aircraft among the one or more aircraft has a status transition from an airborne status to a ground status or from a ground status to an airborne status.

15. The system of claim 1, wherein the one or more processors are further configured to compare the maneuver data with at least one of geographic data from a geographic data store and navigation data from a navigation data store.

16. A method comprising:
   receiving, by one or more processors, surveillance data collected from one or more aircraft;
   identifying, by the one or more processors, from the collected surveillance data, aircraft maneuver data indicative of maneuvers of the one or more aircraft;
   storing, by the one or more processors, the aircraft maneuver data in a data store;
   performing, by the one or more processors, one or more analyses of the stored aircraft maneuver data in the data store; and
   generating, by the one or more processors, an alerting output based on the one or more analyses of the stored aircraft maneuver data.

17. The method of claim 16, wherein the aircraft maneuver data comprises data indicative of takeoff and landing maneuvers of the one or more aircraft.

18. The method of claim 17, wherein identifying the data indicative of the takeoff and landing maneuvers of the one or more aircraft from the collected surveillance data comprises identifying data from the collected surveillance data indicative of at least one of a flare, a touchdown, and a landing roll of each of one or more of the aircraft performing a landing, and at least one of a takeoff roll start, a takeoff roll, and a takeoff of each of one or more of the aircraft performing a takeoff.

19. The method of claim 16, wherein generating the alerting output based on the one or more analyses of the stored aircraft maneuver data comprises one or more of:

generating an air traffic procedural trajectory prediction alerting output; generating a wake vortex turbulence avoidance alerting output; and generating an enhanced Traffic Situation Awareness and Alert (TSAA) output.

20. A device comprising:
means for receiving surveillance data collected from one or more aircraft;
means for identifying, from the collected surveillance data, aircraft maneuver data indicative of maneuvers of the one or more aircraft;
means for storing the aircraft maneuver data in a data store;
means for performing one or more analyses of the stored aircraft maneuver data in the data store; and
means for generating an alerting output based on the one or more analyses of the stored aircraft maneuver data.

\* \* \* \* \*